Figures 1, 2:
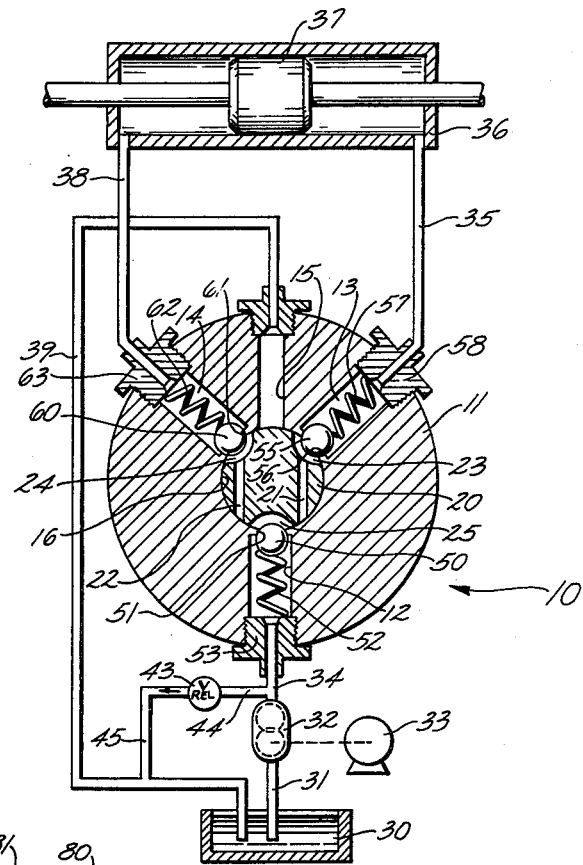

March 2, 1965  W. G. SUECHTING, JR  3,171,437
CONTROL VALVE
Filed June 29, 1962

INVENTOR.
William G. Suechting Jr.
BY
Cyril M. Hajewski
Attorney 3,171,437
CONTROL VALVE
William G. Suechting, Jr., 3245 E. Mallory Ave., Cudahy, Wis.
Filed June 29, 1962, Ser. No. 206,475
5 Claims. (Cl. 137—609)

This invention relates generally to control valves and more particularly to an improvement in control valves that are especially adapted to prevent the leakage of fluid through the valve.

In order to avoid the leakage of hydraulic fluid through control valves it is necessary to construct the valves to very close tolerances and even then it can be expected that a certain amount of leakage will occur between the movable valve members and the walls of the valve body with which they are engaged. The leakage of fluid through such control valves can be very annoying in certain installations and the manufacture of valve parts to extremely close tolerances in an effort to avoid such leaks is expensive.

It is therefore a general object of the present invention to provide an improved control valve especially adapted to prevent the leakage of fluid through the valve.

Another object of the present invention is to provide a control valve constructed to prevent the leakage of fluid through the valve without the necessity of manufacturing the valve parts to extremely close tolerances.

Another object of the invention is to provide a control valve with supplemental check valve means for stemming the flow of hydraulic fluid through the valve when the latter is inoperative, without interfering with the normal operation of the control valve.

A further object of the invention is to provide a control valve with supplemental valve structure that stems the flow of hydraulic pressure through the control valve when the control valve is idle but which is automatically released when the control valve is operated for admitting pressure through it.

A further object is to provide an improved control valve especially adapted to prevent the leakage of hydraulic fluid through the valve which is of simple and inexpensive construction but extremely efficient in operation.

According to this invention the improved control valve comprises a valve body with a movable valve spool having conventional passages for admitting fluid through ports formed in the valve body. The valve body ports are provided with check valves that normally prevent the flow of hydraulic pressure through the ports to thereby eliminate the constant application of hydraulic pressure through the passages of the valve spool and through the juncture of the valve spool with the wall of the valve body. However, when the valve spool is actuated to admit the flow of fluid pressure through the valve, the spool, in turn, actuates the check valves to shift them from their normal condition so that they then will not interfere with the flow of hydraulic fluid through the control valve.

The foregoing and other objects of the invention which will become apparent from the following detailed specification setting forth an illustrative embodiment, may be achieved by the particular apparatus depicted in and described in connection with the accompanying drawings, in which:

FIGURE 1 is a cross-sectional view of a rotary control valve that incorporates the features of the present invention, with the accompanying hydraulic circuitry being illustrated diagrammatically; and FIGURE 2 is a cross-sectional view of a control valve having a reciprocating valve spool and incorporating the features of the present invention, with the associated hydraulic circuitry being depicted diagrammatically.

Reference is now made more particularly to the drawings and specifically to FIG. 1 thereof which illustrates the features of the present invention incorporated in a control valve generally identified by the reference numeral 10. The valve 10 comprises a valve body 11 having an intake port 12 and two control ports 13 and 14 as well as an exhaust port 15.

The flow of hydraulic fluid through the ports 13 and 14 of the valve 10 is regulated by the operation of a rotary valve spool or plunger 20 that is rotatably disposed within a bore 16 formed in the valve body 11 and has a pair of passages 21 and 22. A cavity 23 is formed in the periphery of the valve spool 20 and is in communication with the passage 21. The cavity 23 is of sufficient breadth to remain in registration with the port 13 through out the limit of rotary movement of the valve spool 20.

A similar cavity 24 is also formed in the periphery of the valve spool 20 in position to communicate with the passage 21. The cavity 24 remains in constant registration with the port 14 during the limits of rotary movements of the valve spool 20. A third cavity 25 is formed in the periphery of the valve spool 20 to have full registration with the intake port 12 when the valve spool 20 is in its neutral position for terminating the flow of hydraulic pressure through the control valve 10.

When the rotary valve spool 20 is rotated to its limit of rotation in a clockwise direction, as viewed in FIG. 1, the passage 21 and cavity 23 are shifted to connect the intake port 12 to the port 13 while the cavity 24 is moved to connect the port 14 to the exhaust port 15. As a result, the hydraulic fluid will be drawn from a sump 30 through a conduit 31 by a pump 32 that is driven by a motor 33, the driving connection between the pump 32 and the motor 33 being represented by a broken line in FIG. 1. The pump 32 forces the fluid through a conduit 34 into the intake port 12 of the valve 10. Since the valve spool 20 has been rotated to its limit of movement in a clockwise direction, the passage 21 is in communication with the intake port 12 to carry the fluid to the cavity 23 which is in registration with the port 13. Accordingly, the flow of fluid pressure continues into the port 13 and a conduit 35 which is connected to the right end of a cylinder 36. The fluid is thus directed into the right end of the cylinder 36 to force a piston 37 in a leftward direction within the cylinder 36 as viewed in FIG. 1.

The leftward movement of the piston 37 forces the fluid on the left side of the piston 37 into a conduit 38 which is connected to the left end of the cylinder 36. The conduit 38 carries the exhaust fluid from the cylinder 36 into the port 14 of the control valve 10. The clockwise rotary movement of the valve plunger 20 shifts the cavity 24 so that it registers with both the port 14 and the exhaust port 15 to place the port 14 in communication with the exhaust port 15 so that the fluid flows from the port 14, through the cavity 24 into the exhaust port 15 and thence through a return line 39 to the sump 30.

The piston 37 is shifted to its rightward position within the cylinder 36 by rotating the valve spool 20 in a counterclockwise direction to its limit of movement. When this occurs, the passage 22 and the cavity 24 in the valve plunger 20 place the intake port 12 into communication with the port 14 to carry the fluid to the left end of the cylinder 36. Such rotary movement of the valve spool 20 also causes the cavity 23 to register with both the port 13 and the exhaust port 15 to thereby place the exhaust port 15 in communication with the port 13 so that the exhaust fluid from the right side of the piston 37 is directed therethrough into the return line 39 to be carried back to the sump 30.

Excess pressure developed by the pump 32 will flow through a relief valve 43 that is connected to the pressure conduit 34 by a conduit 44 and the fluid flows from the relief valve 43 into a conduit 45 that is connected to the return line 39 for transmission back to the sump 30.

It will be noted that the intake port 12 is subjected to constant pressure from the pump 32 and the ports 13 and 14 are subjected to back pressure from the cylinder 36. In order to prevent these pressures from being applied to the rotary valve plunger 20, the control valve 10, in the exemplary embodiment illustrated in FIG. 1, is provided with a check valve in each of the ports 12, 13 and 14 in accordance with the teachings of the present invention.

In the present embodiment, each of the ports subjected to hydraulic pressure is provided with a ball type check valve to prevent the hydraulic pressure from being applied to the rotary valve plunger 20 when the latter is in its neutral position to stop the flow of fluid through the valve. Thus, the intake port 12 is provided with a ball 50 that is forced against a seat 51 by a spring 52 which is compressed between the ball 50 and a fitting 53 that is provided for connecting the conduit 32 to the intake port 12. When the ball 50 is in full engagement with its seat 51 a portion of the ball extends into the cavity 25 which is in full registration with the port 12 when the valve spool 20 is in its neutral position as previously described. As a result, rotary movement of the valve spool 20 in either direction will cause the edge of the cavity 25 at the periphery of the spool 20 to engage the ball 50 and force it off of its seat 51 into the port 12 against the pressure of the spring 52 to open the port for permitting the flow of pressure from the pump 32 through the port 12. The portion of the spool 20 that forms the edge of the cavity 25 therefore serves as an actuating means for actuating the ball 50 off of its cooperating seat 51 against the force developed by the spring 52.

The port 13 in the valve body 11 is likewise provided with a check valve that operates in the same manner. It comprises a ball 55 that is forced into engagement with a seat 56 by a spring 57 that is compressed between the ball 55 and a fitting 58 which is provided for connecting the conduit 35 to the port 13.

When the valve spool 20 is in its neutral position to prevent the flow of fluid through the valve, the cavity 23 is in full registration with the port 13 and the ball 55 extends into the clearance created by the cavity 23. As a result, when the plunger 20 is rotated in either direction from its neutral position, the edges of the cavity 23 at the periphery of the spool 20 engage the ball 55 and force it off of its seat 56 into the port 13 against the pressure of the spring 57. This, of course, opens the port 13 to admit the flow of pressure through it in either direction.

A similar check valve is likewise provided in the port 14 for preventing the back pressure from the left end of the cylinder 38 to be applied to the valve spool 20. The check valve in the port 14 comprises a ball 60 forced into engagement with a cooperating seat 61 by a spring 62 which is compressed between the ball 60 and a fitting 63 that is provided for connecting the conduit 38 to the port 14. When the valve spool 20 is in its neutral position, the ball 60 extends into the clearance created by the cavity 24, and when the spool 20 is rotated in either direction from its neutral position, the edge of the cavity 24 at the periphery of the plunger 20 engages the ball 60 to force it off of the seat 61 into the port 14 against the pressure of the spring 62 to admit the flow of fluid through the port. On the other hand, when the ball 60 is in full engagement with the seat 61 it prevents the back pressure from the left end of the cylinder 36 from passing through the port 14 to act against the rotary spool 20.

The three ball checks 50, 55 and 60 are therefore in full engagement with their cooperating seats 51, 56, and 61, respectively when the valve spool 20 is in its neutral position. Accordingly, the three check valves prevent the pressure from the pump 32 or the back pressure from either end of the cylinder 36 from passing through their cooperating ports to act against the valve spool 20 when the latter is in its neutral position for terminating the flow of fluid through the control valve 10. As a result, since the pressure on the valve plunger 20 is relieved when it is in its neutral position, there is no tendency for the pressure to force the fluid between the periphery of the valve spool 20 and the valve body bore 16 in which it is located. The leakage of fluid through this juncture is therefore eliminated without the necessity of fitting the plunger 20 to extremely close tolerances within the bore 16. As a matter of fact, valve design dictates that the diameter of the plunger 20 always be slightly smaller than the diameter of the bore 16 to permit the plunger 20 to be freely rotated within the bore 16. Although this space may be extremely minute, hydraulic fluid under pressure can seep through it. However, since the present invention relieves this pressure upon the rotary spool 20 when the latter is in its neutral position the seepage of fluid about the periphery of the spool 20 is eliminated.

FIG. 2 illustrates the application of the present invention to a control valve generally identified by the reference numeral 65 and having a reciprocating valve spool 66 in lieu of the rotary type spool. The spool 66 is slidably contained within a bore 67 formed in a valve body 68. The valve spool 66 is normally urged into a central neutral position by a pair of springs 69 and 70, the spring 69 being disposed within the bore 67 on the left side of the spool 66 while the spring 70 is similarly located within the bore 67 but on the right side of the spool 66. The spool 66 may be shifted in either direction from the neutral position shown against the force exerted by the springs 69 and 70 by a pair of solenoids 71 and 72 disposed about cooperating armatures 73 and 74 respectively, which are secured to the ends of the spool 66.

As an exemplary embodiment the drawing shows the control valve 65 connected to regulate the flow of hydraulic pressure for actuating a piston 80 slidably contained within a cylinder 81. The hydraulic pressure for actuating the piston 80 is developed by a pump 82 which is connected to be driven by a motor 83 with the driving connection between the motor 83 and the pump 82 being illustrated diagrammatically by a broken line. The pump 82 draws the hydraulic fluid from a sump 84 through a conduit 85 and discharges the fluid into a conduit 86 which is connected to an intake port 87 formed in the valve body 68.

The valve spool 66 is shown in its neutral position wherein it blocks the flow of fluid from the port 87. If the spool 66 is shifted leftwardly by energization of the solenoid 71, a transverse passage 88 formed in the spool 66 will move into communication with the port 87 for carrying the hydraulic fluid to a port 89 through a cavity 91 formed in the periphery of the spool 66 in communication with the passage 88. Although the spool 66 is shifted to the left, the cavity 91 remains in registration with the port 89 formed in the valve body 68. The hydraulic pressure flows through the port 89 into a conduit 90 to the right end of the cylinder 81 for actuating the piston 80 in a leftward direction as viewed in FIG. 2. As the piston 80 is moved leftwardly, the hydraulic fluid on its left side is forced into a conduit 91 and flows into a port 92 formed in the valve body 68. From the port 92 the pressure continues into a cavity 93 formed in the periphery of the valve spool 68 and which remains in registration with the port 92 during the entire range of movement of the plunger 66. From the cavity 93 the pressure flows into a passage 94 which communicates with the cavity 93 and that moves leftwardly with the shifting of the plunger 66 to register with a passage 95 formed in the valve body 68. The exhaust fluid then continues into a return line 96 that is connected with the passage 95 and carries the exhaust fluid back to the sump 84.

When the valve spool 66 is shifted in a rightward direction by energization of the solenoid 72, the flow of hydraulic pressure through the valve is in the opposite direction for shifting the piston 80 to the right end of the cylinder 81. The hydraulic pressure from the pump 82 is then carried by the passage 94 to the left end of the cylinder 81 and the exhaust fluid is transmitted through the passage 88 which carries it to a conduit 101 formed in the valve body 68. From the passage 101 the exhaust fluid flows into a return line 102 that carries it back to the sump 84.

It is apparent from the above description that the direction of flow of fluid to the cylinder 81 is controlled by shifting the valve spool 66 rectilinearly in either a leftward or rightward direction for actuating the piston 80 to either end of the cylinder 81. It is also apparent that when the valve spool 66 is in its neutral position, as shown in FIG. 2, the intake port 87 is subjected to hydraulic pressure from the pump 82 and the ports 89 and 92 are subjected to back pressure from the cylinder 81. In order to prevent this pressure from being applied to the plunger 66, each of these ports is provided with a check valve in accordance with the teachings of the present invention, and which is similar in construction and operation to the check valves described in connection with the control valve 10 shown in FIG. 1.

Thus, the port 87 is provided with a ball 105 that is forced against a cooperating seat 106 by a spring 107 which is compressed between the ball 105 and a fitting 108 that is provided for connecting the conduit 86 to the port 87. When the ball 105 is in engagement with its seat 106, a portion of the ball extends into a cavity 109 that is provided on the periphery of the spool 66 for the sole purpose of accommodating the ball 105, the cavity 109 being in full registration with the port 87 when the spool 66 is in its neutral position. The ball 105 is therefore urged by the spring 107 into full engagement with its seat 106 to prevent the flow of hydraulic pressure through the port 87 when the spool 66 is in its neutral position. Such seating of the ball 105 on the seat 106 relieves the hydraulic pressure on the periphery of the spool 66 to avoid seepage of hydraulic fluid through the space between the surface of the spool 66 and the wall of the bore 67 which contains the spool 66.

On the other hand, when the spool 66 is shifted in either direction from its neutral position for transmitting fluid to the cylinder 81, the edges of the cavity 109 at the periphery of the spool 66 will engage the ball 105 to force it off its seat 106 against the pressure applied by the spring 107 to permit the flow of fluid pressure through the port 87 and into either one of the passages 88 or 94 in the spool 66. With this arrangement, the ball 105 prevents the hydraulic pressure from being applied to the spool 66 when the latter is in its neutral position, but does not interfere with the flow of hydraulic pressure through the valve when the spool 66 is actuated to a position for transmitting the fluid through it.

In like manner the port 89 is provided with a ball 115 that is urged into engagement with a seat 116 by a spring 117 that is compressed between the ball 115 and a fitting 118 that connects the conduit 90 to the port 89. When the spool 66 is in its neutral position, the ball 115 extends into the cavity 91 so that it may be in full engagement with the seat 116 for preventing the hydraulic back pressure from the cylinder 81 to be applied on the periphery of the spool 66. However, when the spool 66 is shifted in either direction, the edges of the cavity 91 at the periphery of the spool 66 move the ball into the port 89 against the pressure of the spring 117 to admit the flow of hydraulic pressure through the port 89.

The port 92 is provided with an identical arrangement, having a ball 125 that is urged into engagement with a cooperating seat 126 by a spring 127. The spring 127 is compressed between the ball 125 and a fitting 128 that is furnished for connecting the conduit 91 to the port 92. When the spool 66 is in its neutral position, as shown in FIG. 2, the ball 125 is in engagement with the seat 126 and extends into the cavity 93. When the ball 125 is thus seated, it prevents the back pressure from the cylinder 81 from flowing through the port 92 and being applied to the periphery of the spool 66. On the other hand, when the spool 66 is shifted in either direction for transmitting fluid through the valve, the edges of the cavity 93 at the periphery of the spool 66 engage the surface of the ball 125 and force it into the port 92 against the pressure of the spring 127 for permitting the free flow of fluid through the port 92.

In both of the illustrated embodiments the ball checks are shown as being positively seated by individual springs in each of the ports to insure the sealing of the ports against the flow of pressure therethrough when the valve plunger is in its neutral position. These springs are not absolutely essential to the operation of the ball checks as it has been found that the hydraulic pressure in the port is normally sufficient to seat the balls for sealing the port.

From the foregoing detailed description of the structure and operation of two illustrative embodiments of the present invention, it will be apparent that the features of the invention may be applied with equal advantage to control valves having either a rotary spool or a reciprocating spool, and in either case the present invention will operate to prevent the hydraulic pressure from being applied to the spool when the valve is in its idle condition and thereby avoids leakage between the relatively movable portions of the valve without manufacturing the valve parts to extremely close tolerances.

Although the illustrative embodiments of the invention have been described in considerable detail for the purpose of making a full disclosure of a practical operative arrangement by means of which the invention may be practised, it is to be understood that various novel features of the invention may be incorporated in other arrangements without departing from the spirit and scope of the invention as defined in the subjoined claims.

The principles of the invention having now been fully explained in connection with the foregoing description of the illustrative embodiments, the invention is hereby claimed as follows:

1. In a valve for controlling the flow of fluid; a valve body having ports for admitting fluid through the valve; a valve plunger movably supported within an opening formed in said body and having a plurality of passages that move with said plunger to selectively communicate with said ports, said plunger having a neutral position for interrupting the flow of fluid through the valve; individual check valves in each of said ports to normally interrupt the flow of fluid through the ports, and actuating means responsive to the movement of said plunger from its neutral position to acutate each of said check valves out of its normal condition and thereby admit the flow of fluid through the ports and the passages in said plunger whenever said plunger is displaced from its neutral position; whereby said check valves stem the leakage of fluid through the valve when the valve is in its neutral position.

2. In a valve for controlling the flow of fluid; a body having a bore and a plurality of ports in communication with the bore for admitting fluid through the valve; a valve plunger having a plurality of passages and movably supported within the bore of said body for selectively shifting the passages into communication with the ports of said body for regulating the flow of fluid through the valve, said plunger being movable into a neutral position for interrupting the flow of fluid through the valve; a valve seat in each of the ports; a check valve member in each of said ports and urged into engagement with said seats for interrupting the flow of fluid through the valve to prevent the leakage of fluid between said valve plunger and said body when said plunger is in its neutral position, and actuating means responsive to the movement of said plunger out of its neutral position to actuate each of said check valve members out of engagement with its cooperating seat to establish the normal flow of fluid through the valve and the passages in said plunger under the control of said plunger.

3. In a valve for controlling the flow of fluid; a body having a bore and a plurality of ports in communication with the bore for admitting fluid through the valve; a valve plunger having a plurality of passages and movably supported within the bore of said body for selectively shifting the passages into registration with the ports of said body for regulating the flow of fluid through the valve, said plunger having a plurality of cavities in its surface that are in communication with the passages in said plunger and register with the ports when said plunger is moved into a neutral position for interrupting the flow of fluid through the valve; a valve seat in each of the ports; and a ball member in each of the ports and urged into engagement with said seat for interrupting the flow of fluid through the valve with a portion of said ball members extending into the cavities of said plunger whenever said ball members are fully seated and said plunger is in its neutral position to prevent the leakage of fluid between said valve plunger and said body when said valve plunger is in its neutral position, said ball members being moved off of their seats by the surface of said plunger when the cavities are moved out of registration with the ports by the shifting of the plunger from its neutral position for admitting the flow of fluid through the valve.

4. In a valve for controlling the flow of fluid; a body having a bore and a plurality of ports in communication with the bore for admitting fluid through the valve; a control element having a plurality of passages and movably supported within the bore of said body for selectively shifting the passages into registration with the ports of said body for regulating the flow of fluid through the valve, said control element having a plurality of cavities in its surface that are in communication with the passages in said control element and register with said ports when said control element is moved into a neutral position for interrupting the flow of fluid through the valve; a valve seat in each of the ports; a spring in each of said ports; and a ball member in each of said ports disposed between said spring and said seat to be urged by said spring into engagement with said seat for interrupting the flow of fluid through the valve to prevent the leakage of fluid between said control element and said body when said control element is in its neutral position, a portion of said ball members extending beyond the ports into the bore of said body for reception into the cavities of said control element whenever said ball members are full seated, said ball members being moved off of their seats by the surface of said control element when the cavities are shifted out of registration with the ports by the movement of said control element out of its neutral position.

5. In a valve for controlling the flow of fluid; a valve body having ports for admitting fluid through the valve; a valve plunger slidably supported for axial movement within an opening formed in said body and having a plurality of passages that move with said plunger to selectively communicate with said ports, said plunger having a neutral position for interrupting the flow of fluid through the valve; individual check valves in each of said ports to normally interrupt the flow of fluid through the ports, and actuating means associated with said plunger and responsive to the axial movement of said plunger in any direction from its neutral position to simultaneously actuate each of said check valves out of its neutral position to thereby admit the flow of fluid through the ports and the passages in said plunger whenever said plunger is displaced from its neutral position; whereby said check valves stem the leakage of fluid through the valve when the valve is in its neutral position.

References Cited by the Examiner
UNITED STATES PATENTS

| | | | |
|---|---|---|---|
| 2,342,770 | 2/44 | Temple | 137—636.1 |
| 2,569,598 | 10/51 | Buchanan | 137—636.1 |
| 2,717,579 | 11/51 | Leduc | 91—370 |
| 3,053,279 | 9/62 | Tikely et al. | 137—596 |
| 3,104,679 | 9/63 | Gouirand | 137—596.2 XR |

M. CARY NELSON, *Primary Examiner.*

LAVERNE D. GEIGER, *Examiner.*